(12) United States Patent
Martin (10) Patent No.: US 11,716,924 B2
(45) Date of Patent: Aug. 8, 2023

(54) ADJUSTABLE ROW CLOSING ASSEMBLIES

(71) Applicant: Ronald Steve Martin, Elkton, KY (US)

(72) Inventor: Ronald Steve Martin, Elkton, KY (US)

(*) Notice: Subject to any disclaimer, the term of this patent is extended or adjusted under 35 U.S.C. 154(b) by 0 days.

(21) Appl. No.: 16/949,098

(22) Filed: Oct. 13, 2020

(65) Prior Publication Data
US 2021/0100158 A1 Apr. 8, 2021

Related U.S. Application Data (63) Continuation-in-part of application No. 16/947,033, filed on Jul. 15, 2020, which is a continuation-in-part of application No. 16/593,765, filed on Oct. 4, 2019, now Pat. No. 11,246,253.

(51) Int. Cl.
*A01B 63/00* (2006.01)
*A01C 5/06* (2006.01)
*A01B 35/16* (2006.01)

(52) U.S. Cl.
CPC ............ *A01C 5/068* (2013.01); *A01B 63/002* (2013.01); *A01B 35/16* (2013.01)

(58) Field of Classification Search
CPC ......... A01B 5/00; A01B 35/16; A01B 63/002; A01C 5/066; A01C 5/068; A01C 7/08
See application file for complete search history.

(56) References Cited

U.S. PATENT DOCUMENTS

| | | | | |
|---|---|---|---|---|
| 3,759,332 A * | 9/1973 | Robertson, Sr. | ..... | A01B 21/083 172/776 |
| 3,878,901 A * | 4/1975 | Robertson, Sr. | ....... | A01B 63/22 172/776 |
| 10,729,053 B2 * | 8/2020 | Martin | .................... | A01B 39/22 |
| 10,918,007 B2 * | 2/2021 | Martin | .................... | A01B 49/06 |
| 10,932,405 B2 * | 3/2021 | Koch | .................... | A01B 76/00 |
| 11,197,413 B2 * | 12/2021 | Sivinski | ................. | A01B 71/04 |
| 11,246,253 B2 * | 2/2022 | Martin | ................. | A01B 63/008 |
| 2020/0214192 A1 * | 7/2020 | Martin | .................... | A01C 5/068 |
| 2021/0100157 A1 * | 4/2021 | Martin | .................... | A01C 5/068 |

* cited by examiner

*Primary Examiner* — Gary S Hartmann
(74) *Attorney, Agent, or Firm* — Duncan Galloway Greenwald PLLC; Kevin T. Duncan (57) ABSTRACT

A closing wheel frame assembly comprising a closing wheel frame, a closing wheel assembly, and a lever arm adjustment assembly. A retaining pin secures a lever arm in a desired position to set an angle or orientation of the closing wheel assembly relative to the frame, seed furrow (trench or trough), or soil surface. Operation of the lever arm changes the angle or orientation of the closing wheel assembly relative to the frame, seed furrow (trench or trough), or soil surface.

16 Claims, 12 Drawing Sheets

ADJUSTABLE ROW CLOSING ASSEMBLIES

CROSS-REFERENCE AND CLAIM OF PRIORITY

The present application is a continuation-in-part of and claims benefit of priority to U.S. patent application Ser. No. 16/947,033, entitled ROW CLOSING ASSEMBLIES, filed 15 Jul. 2020, by Martin et al., which is a continuation-in-part of and claims benefit of priority to U.S. patent application Ser. No. 16/593,765, entitled COMPACT ROW CLOSER AND ROW CLEANER ASSEMBLIES, filed 4 Oct. 2019, by Martin et al., both of which are incorporated by reference herein in their entirety.

FIELD OF THE INVENTION

The present disclosure is generally applicable to the field of agricultural equipment, and more particularly for improved row closing and row cleaning in no-till farming applications and for improved row cleaning and for the closing of seed furrows or trenches or troughs.

Authorization Pursuant to 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used at the front or leading portion of a planter row unit to clear only a small portion or strip of earth of the residue to enable seeds and fertilizer to be placed in the ground in connection with a coulter or other tillage tool. The row cleaner removes the residue and only very lightly tills the topmost soil or earth to provide for a clear path for seed and fertilizer placement. One key aspect to row cleaner operation is to maintain necessary clearance between the row cleaner and the coulter or other tillage tool for terrain responsive operation. Also, at the trailing end of the planter row unit closing wheels are used to close the seed slot opened during row planting operation. This operation is known as row closing and may comprise multiple stages or steps in the closing operation including a first closing operation by a set of closing wheels and a second closing operation by a second closing means.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners. However, these existing row cleaner systems have drawbacks. Fixed row cleaners do not follow or track changes in land elevation as the planter moves over a field. Adjustable and floating row cleaners may not possess the ideal geometry with respect to a planter to provide for optimal row cleaning action by the cleaner wheel assemblies. Additionally, after seeds have been planted the open planted row need to be closed. Existing row closing assemblies comprise similar drawbacks and limitations to those of existing row cleaners. Namely, existing row closing assemblies do not maintain an ideal desired geometry for closing wheels as the closing wheels and row closing assembly travel over terrain. Moreover, existing row closing assemblies do not provide for granular adjustment of the angle of engagement of closing wheels with the soil to accommodate for changes in soil height and condition along a planted row or across all row closing units on a row planter.

Existing row cleaning and closing units are described in at least U.S. patent application Ser. No. 16/593,765, entitled COMPACT ROW CLOSER AND ROW CLEANER ASSEMBLIES, filed 4 Oct. 2019, Martin et al.; U.S. Prov. Pat. App. No. 62/741,438, entitled COMPACT PARALLEL ARM ROW CLOSER AND ROW CLEANER, filed 4 Oct. 2018, Martin et al.; U.S. Prov. Pat. App. 62/803,420, entitled IMPROVED ROW CLEANER/CLOSING WHEEL, filed 8 Feb. 2019, Martin et al.; and U.S. Prov. Pat. App. No. 62/804,208, entitled IMPROVED ROW CLOSING WHEEL ASSEMBLY, filed 11 Feb. 2019, Martin et al., each of which are incorporated by reference herein in their entirety.

What is needed is a row closing assembly 33 and/or row cleaning assembly with an adjustable geometry or angle with respect to the soil to provide for optimal row cleaning operation and/or positive row closing action with a desired level of soil engagement.

SUMMARY OF THE INVENTION

To address the issues identified hereinabove and to provide further improvements to row closing assemblies, the present invention provides a closing wheel frame assembly comprising a closing wheel frame, closing wheel assembly, and a lever arm adjustment assembly for setting an angle or orientation of the closing wheel assembly. The present invention may further comprise a lever-adjustable axle assembly for changing the "toe" or angle of engagement of the closing wheel or wheels with soil.

A lever arm connected at or near a first end of an axle may be operated up or down or rotated to change an angle of a closing wheel assembly fixed to an angled face or angled terminal portion at or near a second end of the axle opposite the first end. The lever arm many be manually operated up or down to rotate the adjustable axle to cause the relative angle or position of the closing wheel to change relative to the closing wheel frame, to a seed trough or furrow or trench, or to the soil or ground surface.

The present invention further provides a closing wheel assembly adapted configured to provide for the adjustment of the orientation of closing wheels with respect to the furrow. The closing wheel assembly consists of a lever adjustment assembly that is pivotally mounted to the axle assembly and may move relative to the adjustable closing wheel frame. One end of the lever forms a handle and the opposite end attaches to an axle, the axle having an angled end for attaching a closing wheel on a hub. A set of openings or securing points are provided on a lever arm arm to secure the lever in a desired position, which consequently secures the closing wheel and axle attached to that angle lever in a desired orientation. If the closing wheel is angled with respect to the furrow in either the vertical or horizontal planes, adjusting the lever may compensate for orientation changes in the closing wheels due to changes in penetration depth of the closing wheels.

A closing wheel or wheels are affixed to an axle or other support member, which provides rotational movement of the wheel(s) relative to the frame and ground. The angular positioning of the wheel(s) relative to the frame effects the relative aggressiveness of the wheel(s) during closing operation when closing a furrow. "Camber" or "camber angle" is the inward or outward tilt of the centerline of the wheel(s) as viewed from the front relative to true vertical with inward tilt (top of the wheel(s) closer to vertical axis and bottom of the wheel(s) farther from vertical axis) being negative and outward tilt (top of the wheel(s) farther from vertical axis and bottom of the wheel(s) closer to vertical axis) being positive. "Toe" or "toe angle" is the side-to-side difference in distance between the front and rear of the wheel(s) relative to one another or to a center axis of the closer assembly as viewed from above. "Toe-in" is when the distance is closer at the front and "toe-out" is when the difference is closer at the rear. Defining what is rear and what is front determines whether a non-neutral orientation is toe-in or toe-out. Generally, the front is considered toward the direction of travel (moving forward) of the wheels and the object to which the wheels are attached. As the closing wheel frame assembly is at the rear of the row planter unit as it moves forward during row planting operation, we will describe the invention in terms of the front of the closing wheel frame assembly as being in the direction of (forward) travel of the row planter unit.

The lever provides an interface through which the angle (s) (including toe and/or camber) of a closing wheel on a closing wheel frame may be re-oriented with respect to the ground. The relative toe, camber, and/or angle of penetration of the closing wheels on the axle may be adjusted by manipulating the lever and securing it one of a plurality of locking points on the adjustable closing wheel frame.

Additionally, altering or increasing the angle, toe, or camber of the wheels relative to their engagement with the ground may be said to provide a more "aggressive" engagement with the soil which is desirable in moist or wet soil conditions. Having a less "aggressive" engagement with the soil may be desirable in drier soil conditions.

In one embodiment, the present invention provides a closing wheel frame assembly comprising: a closing wheel frame comprising a first end adapted to be rotatably secured to a row planter unit and a second end; a closing wheel assembly comprising a closing wheel and a hub; and a linkage mechanism comprising: a retaining pin; a lever arm comprising a first end comprising a set of securing points, and a second end; an adjustable axle comprising a shaft, a first end fixedly secured to the second end of the lever, and a second end having and angled face; wherein the lever arm is adapted to be adjusted between securing points in the set of securing points and secured in by the retaining pin; and wherein adjustment of the lever arm between the set of securing points sets at least one angle or orientation of the closing wheel assembly relative to the closing wheel frame by rotating the first end of the adjustable axle and correspondingly rotating the shaft and the second end of the adjustable axle.

The closing wheel frame of the above embodiment may further comprise, wherein the rotating of the first end of the adjustable axle by the adjustment of the lever arm sets an angle and orientation of the angled face of the second end of the adjustable axle relative to the closing wheel frame. The adjustment of the lever arm may set a toe angle orientation of the closing wheel assembly. The set toe angle orientation may be a minimum toe-out angle. The toe-out angle orientation range from minimum to middle to maximum may be, for example, configured to allow an adjustable range of between 0 and 15 degrees from neutral toe to maximum toe-out range. The closing wheel assembly may be positioned at an angle 20 degrees from vertical. The adjustment of the lever arm may set a vertical angle orientation of the closing wheel assembly. The closing wheel frame assembly may provide positioning of the lever along the set of positions to set a toe orientation of the closing wheel assembly between a minimum toe-in orientation of 5 degrees and a maximum toe-out orientation of 15 degrees. The retention mechanism may include a bolt and nut combination adapted to engage, disengage, and reengage with the set of securing points to secure the lever in a desired position.

BRIEF DESCRIPTION OF THE FIGURES

In order to facilitate a full understanding of the present invention, reference is now made to the accompanying drawings, in which like elements are referenced with like numerals. These drawings should not be construed as limiting the present invention, but are intended to be exemplary and for reference.

In order that the advantages of the cleaning wheel will be readily understood, a more particular description of the assemblies briefly described above will be rendered by reference to specific embodiments illustrated in the appended drawings. Understanding that these drawings depict only typical embodiments of the cleaning wheel and are not therefore to be considered limited of its scope, the assemblies will be described and explained with additional specificity and detail through the use of the accompanying drawings.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, "fastener" may mean any suitable fastening means such as a nut and bolt, a rivet, or a pin and cotter pin. Typically, as used herein a fastener refers to a threaded bolt, which may have a hexagonal bolt head, secured by a correspondingly threaded nut having a hexagonal outer surface, wherein one or more washers may be used to permit movement of a fastened object about the bolt. In some embodiments, a locking nut may be used to further secure the nut to the bolt and to prevent the nut from backing off of the threads of the bolt.

Figure 1:
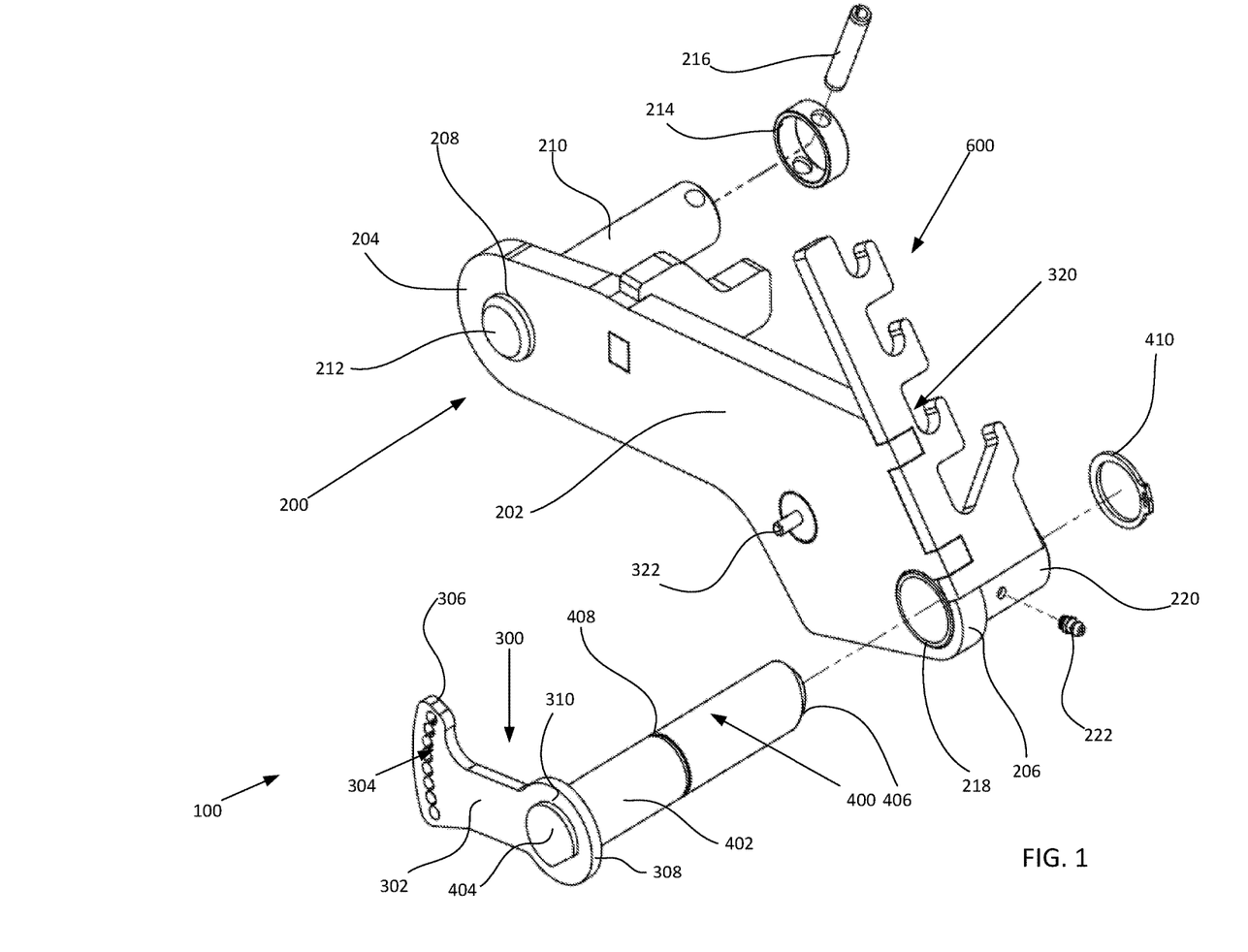
FIG. 1 provides a top, left perspective exploded view of the components of a closing wheel frame and lever adjustment assembly according to an embodiment of the present invention.

With reference now to FIG. 1 a top, left perspective exploded view of the components of a closing wheel frame 200 and lever adjustment assembly 300 of the closing wheel frame assembly 100 is provided. The closing wheel frame assembly comprises a closing wheel frame or frame assembly 200, a lever adjustment assembly 300, an adjustable axle or axle assembly 400, and a tension or down pressure adjustment plate 600. The down pressure adjustment plate 600 operates with or against a biasing handle or spring component of a row planting unit to provide or apply a down pressure on a closing wheel and/or to limit the vertical movement of the frame assembly 200.

The frame 200 comprises a frame body 202, a first end 204, and a second end 206. An opening 208 secures, such as by pressure fit, threading, spring clip, or welding, a rotating or mounting arm 210. The securing means 212 may be a c-clip, spring clip, threaded nut, or other suitable securing means for securing the mounting arm 210 in the opening 208. A clip or retaining ring 214 is held by retaining pin 216 (e.g., in connection with openings or bores or the like formed in complementary components) such that the frame 200 may be installed on a corresponding mounting or receiving opening on a row planting unit. When installed on a row planting unit, the frame 200 may rotate about the mounting arm 210, which with securing means 212 provides a rotational or pivot axis. In this exemplary manner the second end 206 of the frame 200 is permitted to move relatively up and down along an arc defined by the second end 206 wherein a closing wheel would be permitted to move along with changes in surface or soil elevation.

The lever adjustment assembly 300 comprises the lever arm 302 which has a first end 306 and a second end 308. A set of securing or securement points or openings 304 at the first end 306 of the arm 302 may be used to secure the lever arm 302 in one of a plurality of positions. The adjustable axle assembly 400 comprises a body or shaft 402, a first end 404, a second end 406 and a groove 408. The first end 404 of the body 402 is keyed, shaped, or grooved in a corresponding manner to an opening 310 in the second end 308 of the lever arm 302. The body 402 of the axle assembly 400 is secured in an axle shaft opening 218 of the frame assembly 200 by a clip or ring 410 in cooperation with mating groove 408. A shaft receiving member 220 may comprise a bearing and supports and positions the body 402 of the axle assembly 400 in a perpendicular orientation relative to the frame body 202. A pin or plug 222 may be used to seal or permit oiling of the axle body 402.

Figure 2:
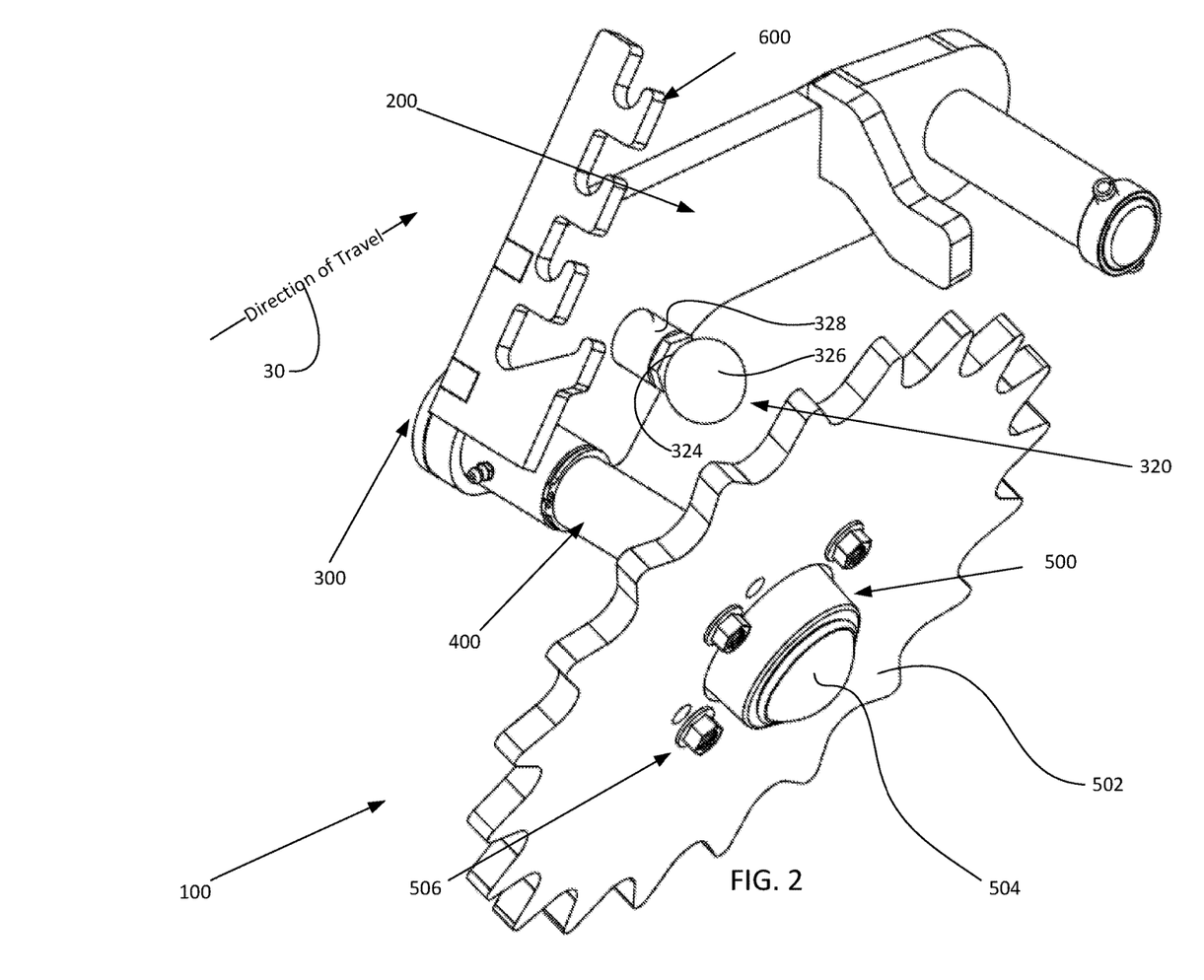
FIG. 2 provides a top, left perspective view of a closing wheel frame and lever adjustment assembly with a mounted closing wheel and hub according to an embodiment of the present invention.

The lever adjustment assembly 300, which comprises the retaining pin assembly 320 shown in greater detail in FIG. 2, is used to rotate the adjustable axle assembly 400 such that an attached closing wheel assembly (e.g., closing wheel assembly 500 shown in FIG. 2) may have one or more angles or orientations adjusted, set, or changed by operation of the movement of the lever arm 302. When the first end 306 of the lever arm 302 is moved up or down a corresponding movement occurs in the axle assembly 400. The first end 404 of the axle assembly 400 is fixed, such as by a lock, key, groove, or corresponding shape, in the opening 310 at the second end 308 of the lever arm 302. The first end 404 of the axle assembly 400 therefore cannot rotate within the opening 310 and both the first end 404 and entire axle assembly 400 are rotated by operation of the lever arm 302.

Figure 3:
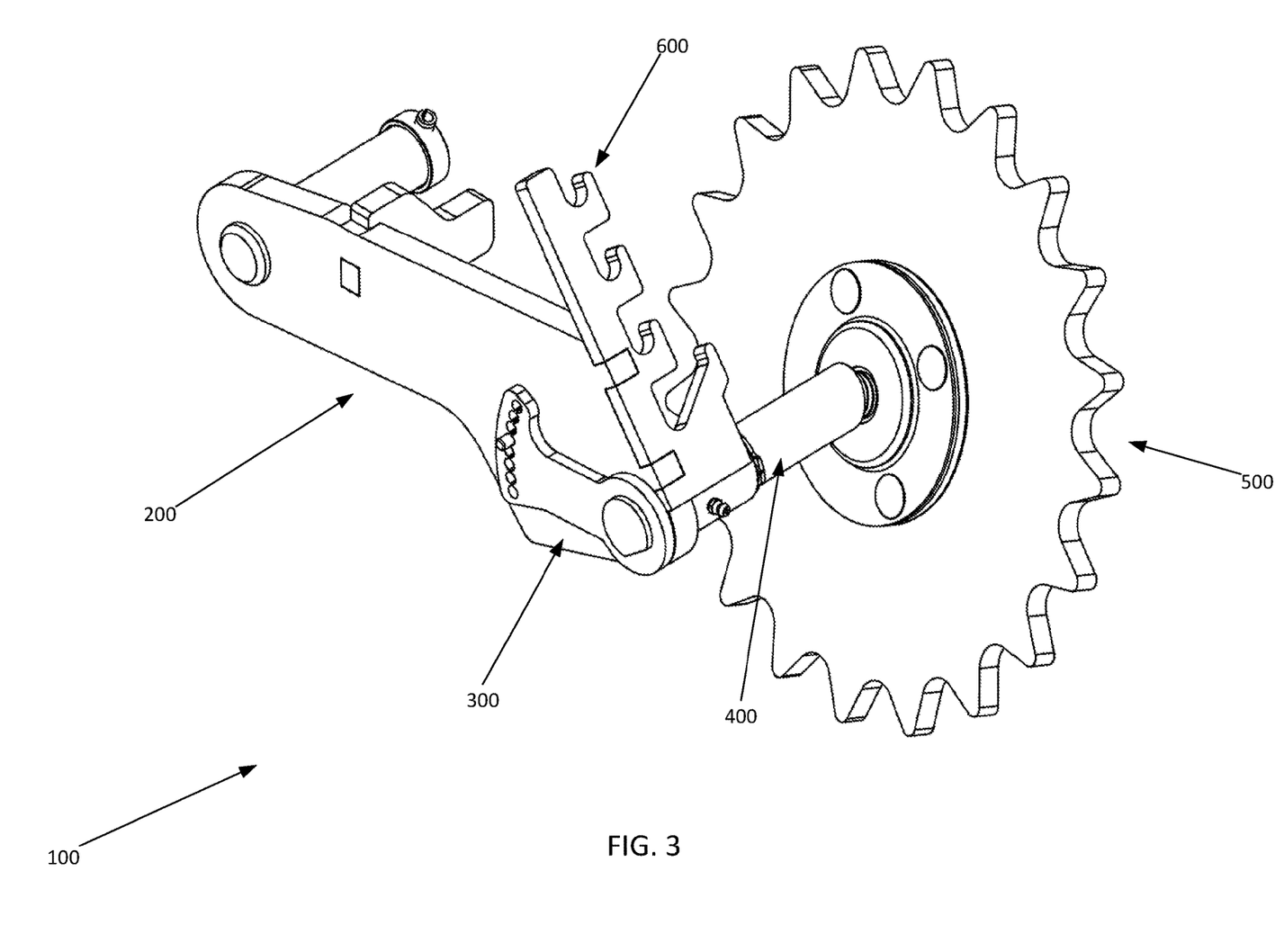
FIG. 3 provides a top, right perspective view of a closing wheel frame and lever adjustment assembly with a mounted closing wheel and hub according to an embodiment of the present invention.

With reference now also to FIGS. 2 and 3, respectively a top, left perspective view of a closing wheel frame 200 and lever adjustment assembly 300 with a mounted closing wheel 502 and hub 504, and a top, right perspective view of a closing wheel frame 200 and lever adjustment assembly 300 with a mounted closing wheel 502 and hub 504 are provided. The closing wheel assembly 500 comprises the closing wheel 502 secured to a hub 504 by a set of fasteners 506.

The first end 306 of the lever arm 302 may be secured in one of a plurality of positions by locking or inserting the retaining pin 322 in one of the set of openings 304. Although lever arm 302 is shown having a series of openings 304 adapted to receive retaining pin 322 for secure positioning, any suitable combination of pins or other protrusion extending into a receiving set of notches, shoulders, bores, ridges or the like is suitable and fully contemplated within the spirit of the invention. The lever arm 302 may be used as a lever or handle for manual operation or adjustment of the position of the lever arm 302. In one exemplary implementation of a retention mechanism for holding lever arm 302 in place, a retaining pin assembly 320 comprises a retaining pin 322, a retaining ring 324, a handle or knob 326, and body or housing 328. The pin 322 is biased in an extended or locked position by operation of a biasing spring or mechanism that is retained within the housing 328 by the retaining ring 324, which may be a threaded bolt, cap, or retaining clip. When a user applies a force to the handle 326, such as by pulling out on the handle in a direction perpendicular to the body 202 of the frame 200, the retaining pin 322 is retracted into the housing 328 and is disengaged from the set of openings 304 in the first end 306 of the lever arm 302. This permits the lever arm 302 to be rotated or moved to align retaining pin 322 with an other of the openings 304. When positioned at a desired position, the handle 326 may be released by the user thereby permitting the retaining pin 322 to extend into or otherwise engage with the aligned openings 304 by operation of the biasing spring or mechanism in the housing 328. Securing the lever arm 302 by engaging the retaining pin 322 in one of the set of openings 304 fixes or locks the lever arm 302 in the desired position during operation of the row planter unit and closing wheel assembly 100. Alternative retention mechanisms include bolt and nut combination in cooperation with a fixation hole or bore or a continuous arc slot or the like for sliding engagement and fixation by loosening and tightening the bolt/nut combination.

Rotating the lever arm 302 to rotate the adjustable axle assembly 400 changes the angle of the face 407 of the second end 406 of the adjustable axle assembly 400 relative to the frame 200 and/or the ground or soil. As the adjustable axle assembly 400 is rotated, the angled face 407 of the second end 406 rotates, and at least one angle or orientation (e.g., toe and/or camber) of the closing wheel assembly 500, which is fixedly secured to the angled face 407 such as by a threaded rod or bolt and correspondingly threaded opening, is changed relative to the frame 200 and/or surface or soil.

For purposes of describing the invention the use of "toe-out" in connection with closing wheel assembly 100 is from the direction of forward travel of the row planter unit, i.e., from the front of the row planter facing toward the closing wheel assembly. The direction of travel 30 shown in FIG. 2 shows the closing wheels rotating and moving in a direction toward the front of the row planter unit, which is consistent with toe orientation from the perspective of being in front of the row planter unit and facing a row cleaning component, then the furrow opening and seed planting section, and then a row closing section having, e.g., the (row) closing wheel assembly 100. From that perspective the closing wheel(s) is (are) oriented in a "toe-out" condition.

Figure 4:
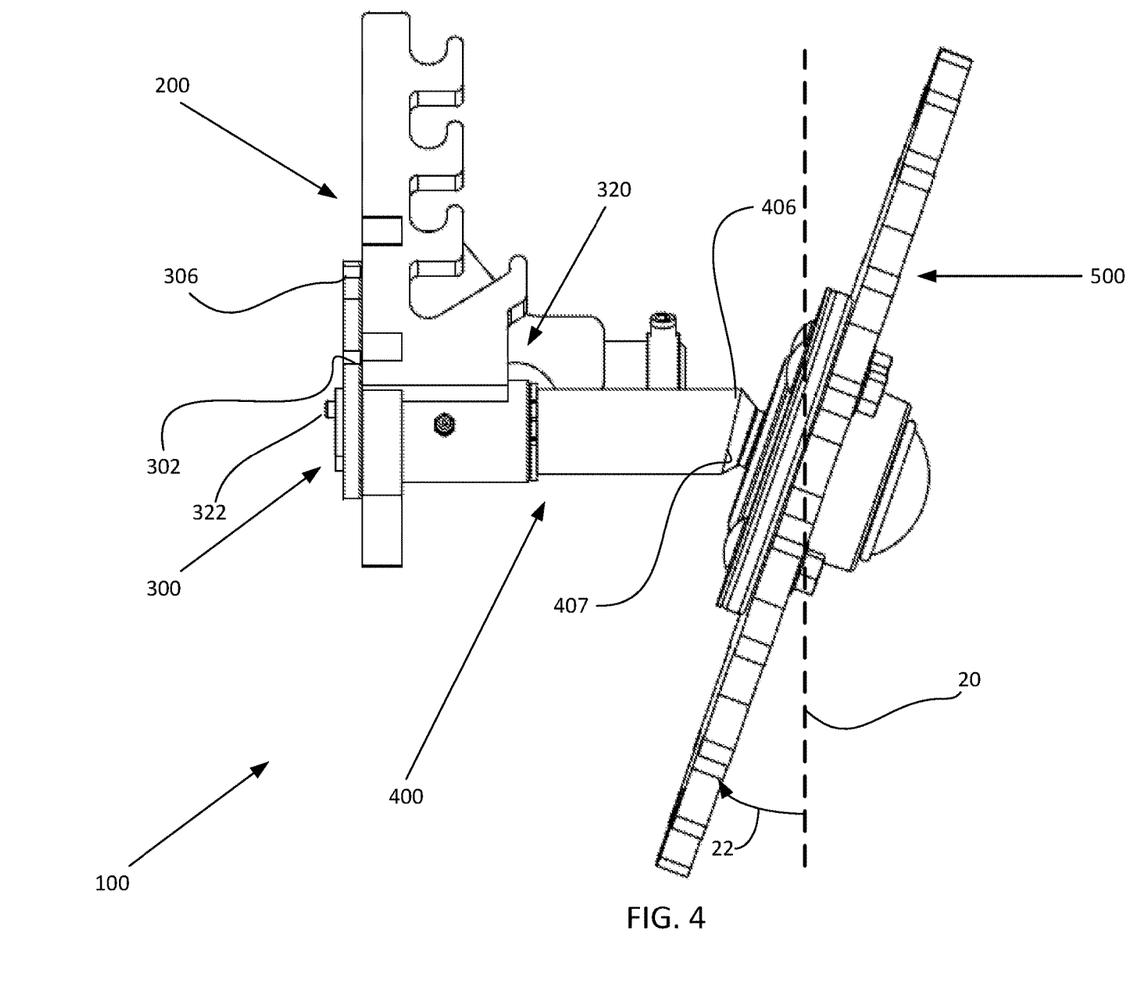
FIG. 4 provides a front view of a closing wheel frame and lever adjustment assembly with a mounted closing wheel and hub in a minimum toe-out configuration according to an embodiment of the present invention.
Figure 5:
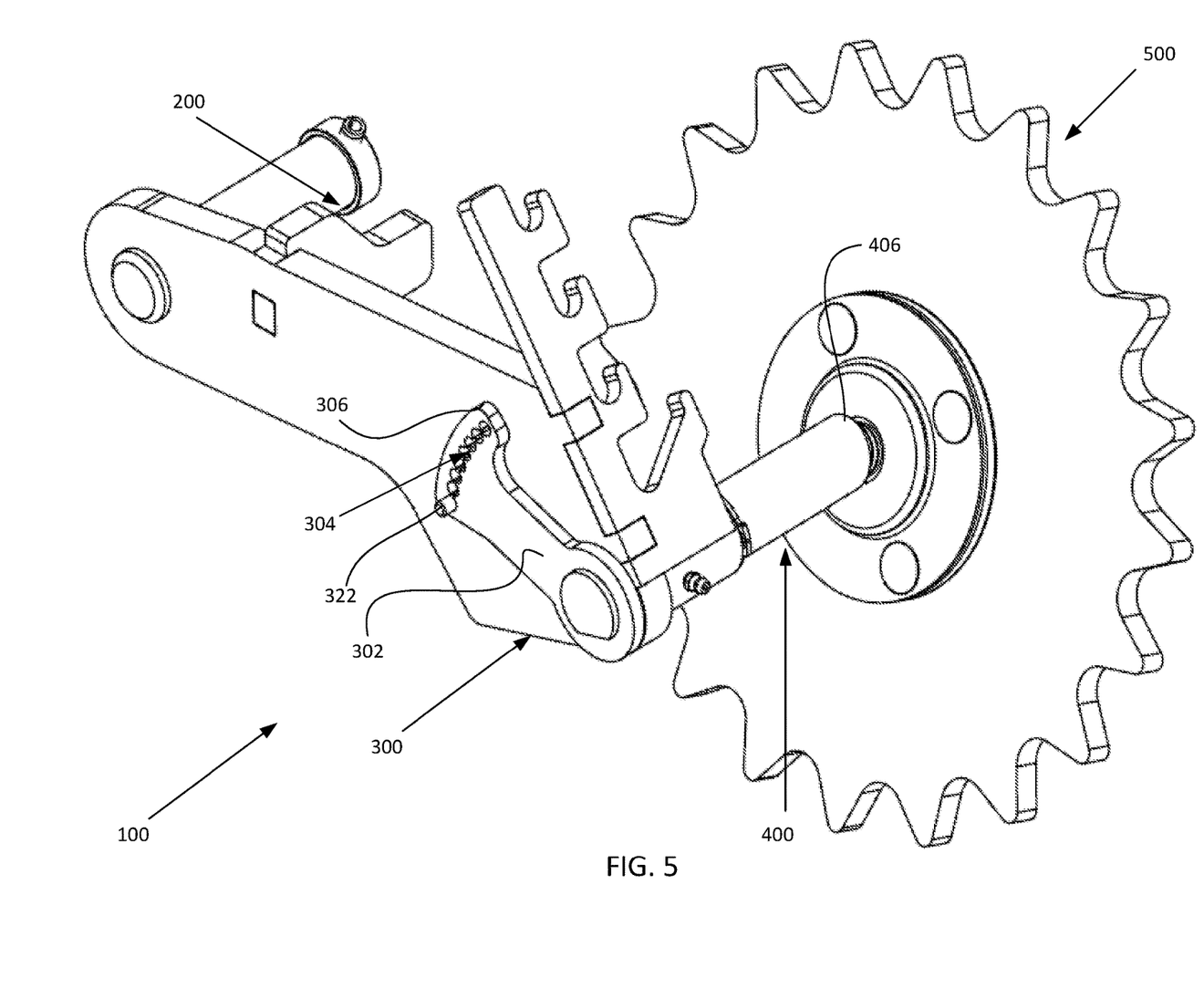
FIG. 5 provides a perspective view of the closing wheel frame and lever adjustment assembly with a mounted closing wheel and hub in a minimum toe-out configuration according to the embodiment of FIG. 4.
Figure 6:
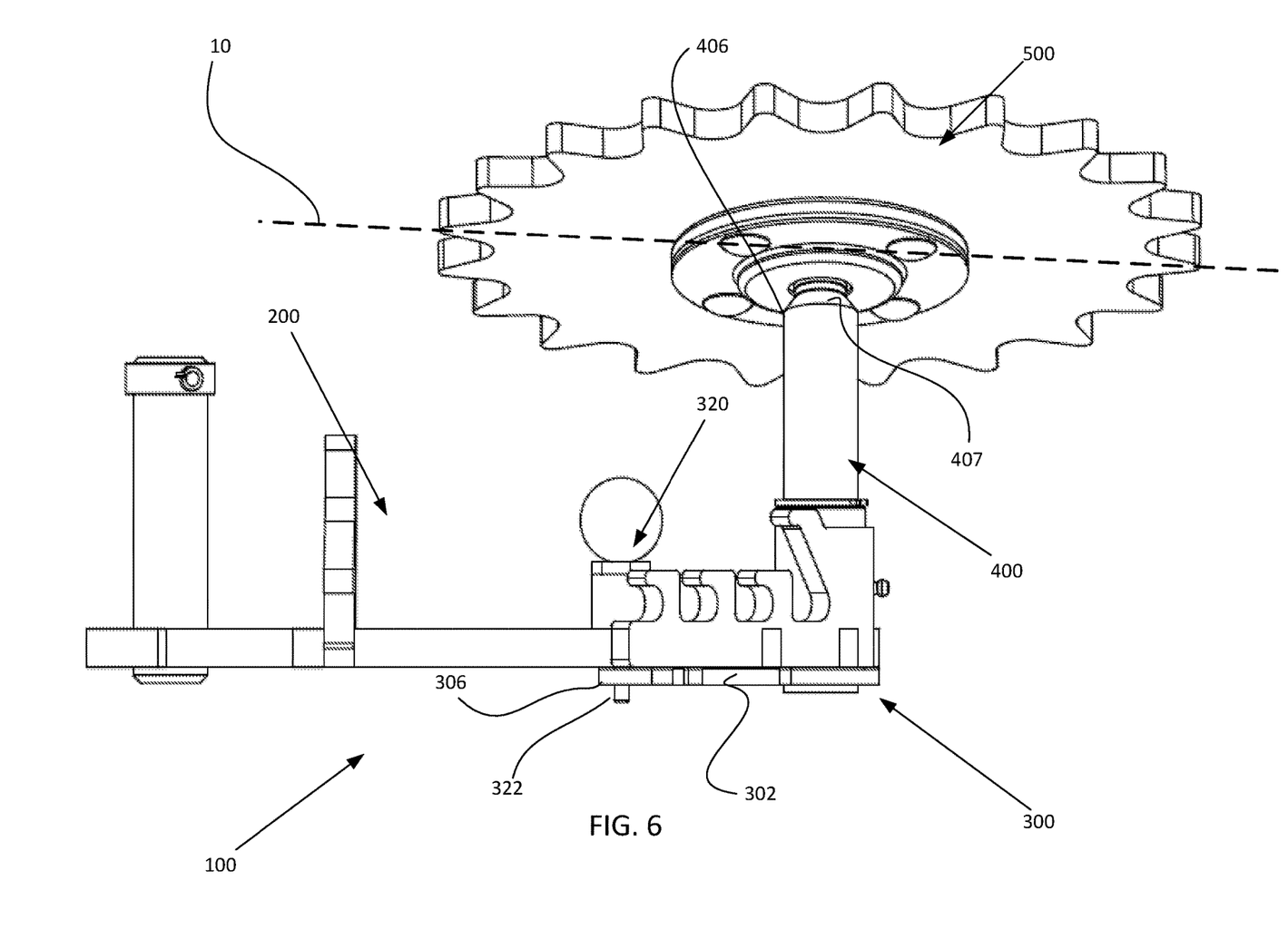
FIG. 6 provides a top view of the closing wheel frame and lever adjustment assembly with a mounted closing wheel and hub in a minimum toe-out configuration according to the embodiment of FIG. 4.

For example, FIGS. 4, 5, and 6 provide respective front, perspective, and top views of a closing wheel frame 200 and lever adjustment assembly 300 with a mounted closing wheel assembly 500 in a positive camber and minimum toe-out configuration. As indicated in FIG. 4, the positive camber has an angle represented by the arc 22 represented the degree off neutral camber indicated by line 20. The adjustable axle assembly 400 may be configured so that the end 406 of body/shaft 402 having angled face 407 allows for a combined toe/camber adjustment upon repositioning of lever arm 302 using the retaining pin assemble 320. Additionally, further mechanisms may be included with the closing wheel assembly 100 to permit independent adjustment of the camber orientation of closing wheel(s) 502.

The following describes an exemplary configuration and operation of closing wheel assembly 100. In one exemplary "minimum" toe-out configuration or orientation the toe-out angle or orientation of the closing wheel assembly is between 0 and 5 degrees relative to a parallel orientation with the frame 200 as shown by line or axis 10 in FIG. 6. In this orientation, the lever arm 302 would be secured in, for example, a lowest or bottom opening in the set of openings 304 by the retaining pin 322. The closing wheel 502 is permitted to freely rotated about the hub 504, but the closing wheel assembly 500 is fixedly secured to the angled face 407 of the second end 406 of the adjustable axle assembly 400. However, the closing wheel assembly may be configured to allow for toe-in orientation of the closing wheel and may provide a range of toe orientation from a toe-in angle of say 5 degrees to a toe-out orientation of say 20 degrees. Also, optimal toe orientation and camber orientation may be affected by the selection of closing wheel type used in the closing wheel assembly. For example, a cupped (convex or concave) wheel design may inherently alter the toe and/or camber orientation of the closing wheel. A cupped wheel may result in overly aggressive soil engagement at a more positive camber angle—a user may lessen the aggressiveness by lowering the camber angle. The benefit of having adjustable toe and camber orientation provides users with a range of equipment to fine-tune the operation of the closing wheel assembly.

Figure 7:
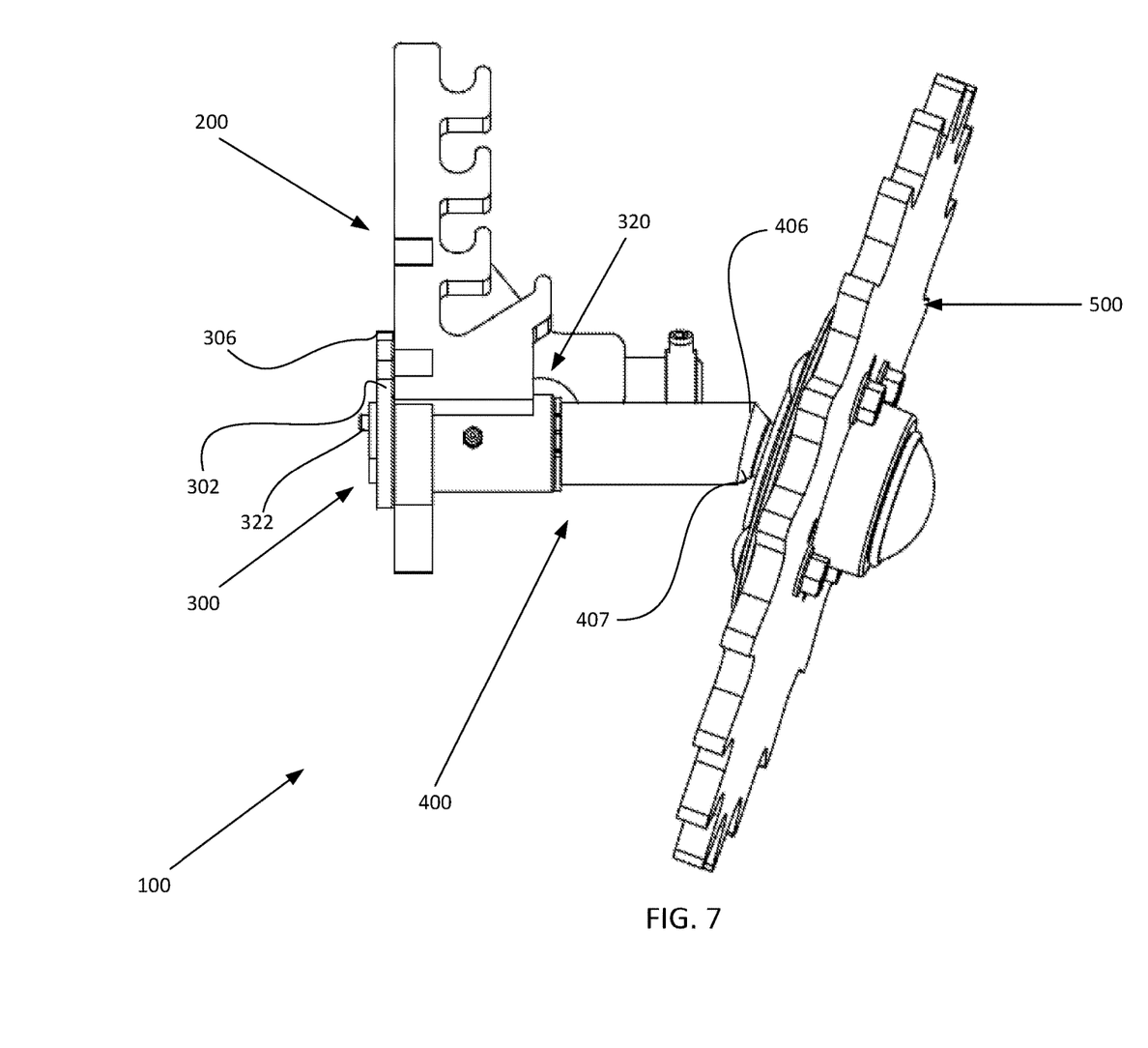
FIG. 7 provides a front view of a closing wheel frame and lever adjustment assembly with a mounted closing wheel and hub in a middle or moderate toe in configuration according to an embodiment of the present invention.
Figure 8:
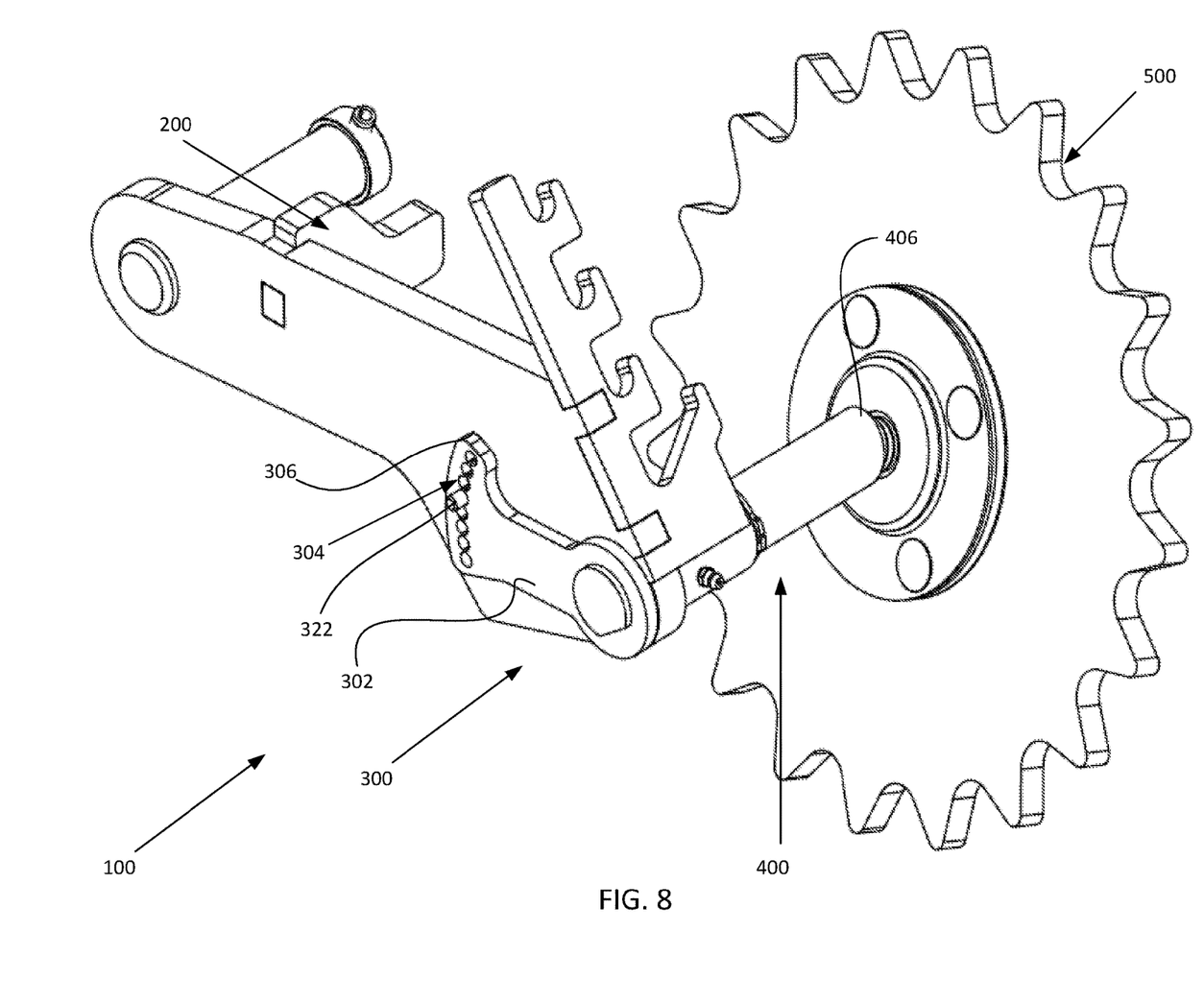
FIG. 8 provides a perspective view of the closing wheel frame and lever adjustment assembly with a mounted closing wheel and hub in a middle or moderate toe in configuration according to the embodiment of FIG. 7.
Figure 9:
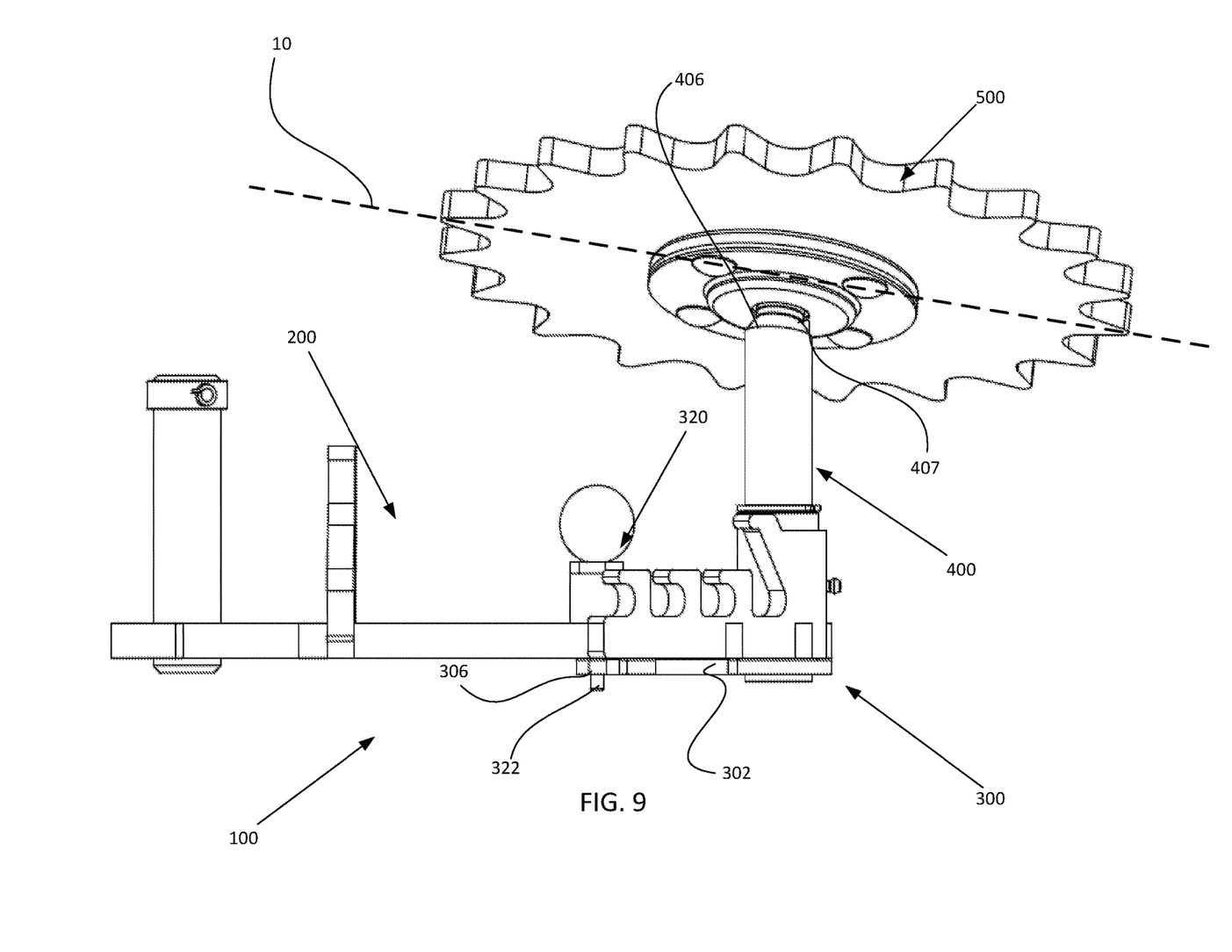
FIG. 9 provides a top view of the closing wheel frame and lever adjustment assembly with a mounted closing wheel and hub in a middle or moderate toe in configuration according to the embodiment of FIG. 7.

FIGS. 7, 8, and 9 provide respective front, perspective, and top views of a closing wheel frame 200 and lever adjustment assembly 300 with a mounted closing wheel assembly 500 in a middle or moderate toe-out and a positive camber configuration. In the "middle" or "moderate" toe-out configuration or orientation the toe-out angle or orientation of the closing wheel assembly is between 3 and 7 degrees relative to a parallel orientation with the frame 200 as shown by line 10 in FIG. 9. In this orientation, the lever arm 302 would be secured in, for example, an opening between the lowest or bottom opening and the highest or top opening in the set of openings 304 by the retaining pin 322.

Figure 10:
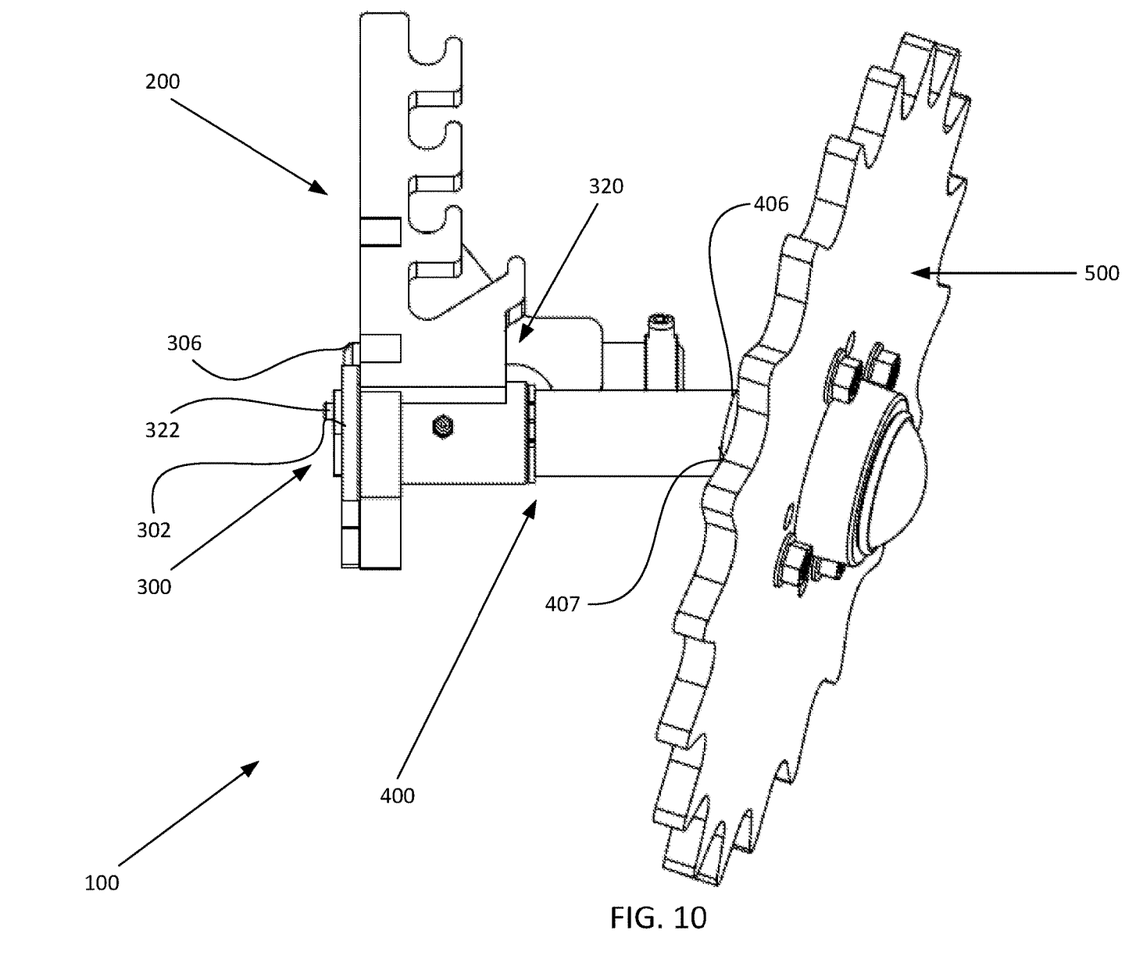
FIG. 10 provides a front view of a closing wheel frame and lever adjustment assembly with a mounted closing wheel and hub in a maximum or aggressive toe-out configuration according to an embodiment of the present invention.
Figure 11:
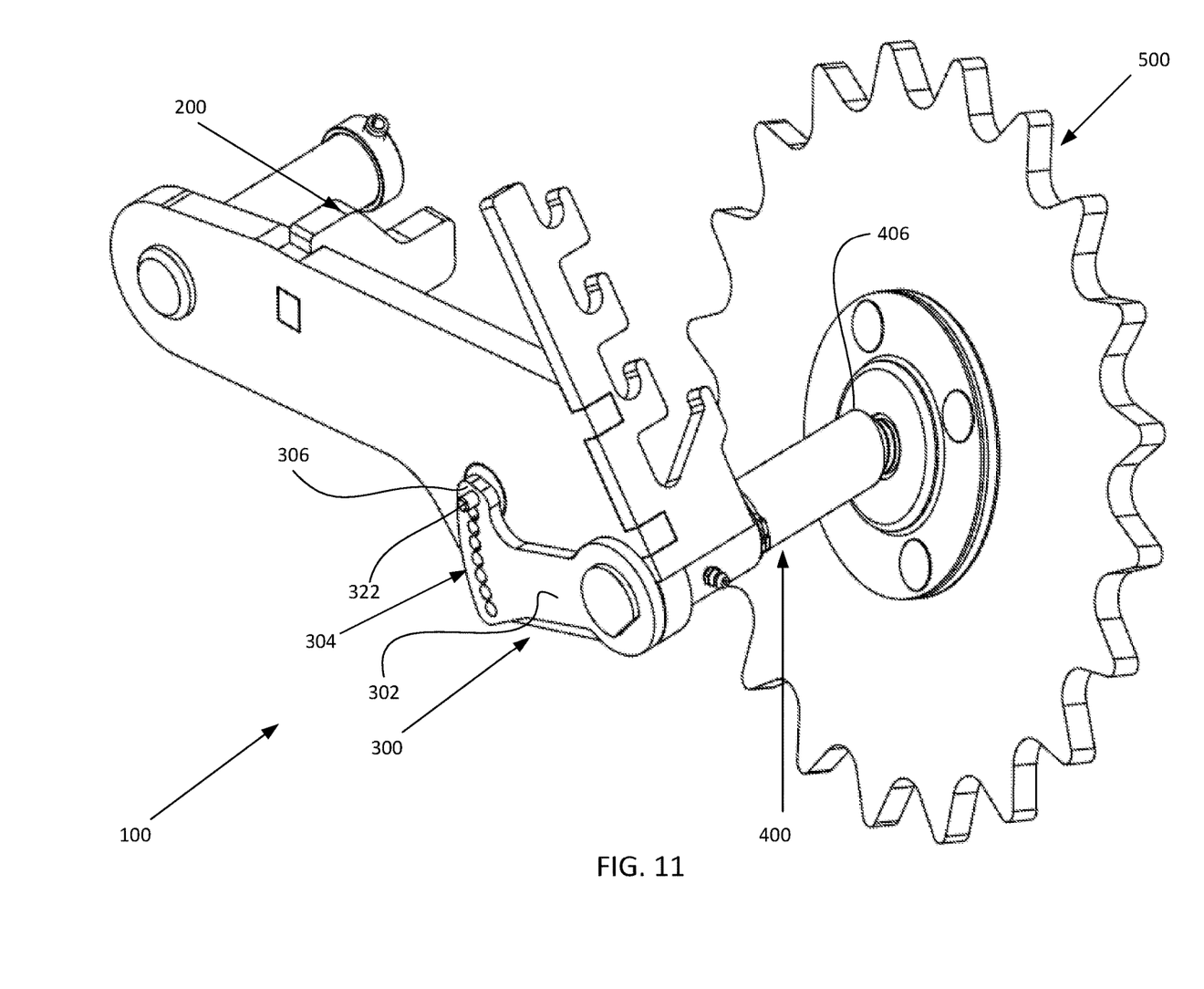
FIG. 11 provides a perspective view of the closing wheel frame and lever adjustment assembly with a mounted closing wheel and hub in a maximum or aggressive toe-out configuration according to the embodiment of FIG. 10.
Figure 12:
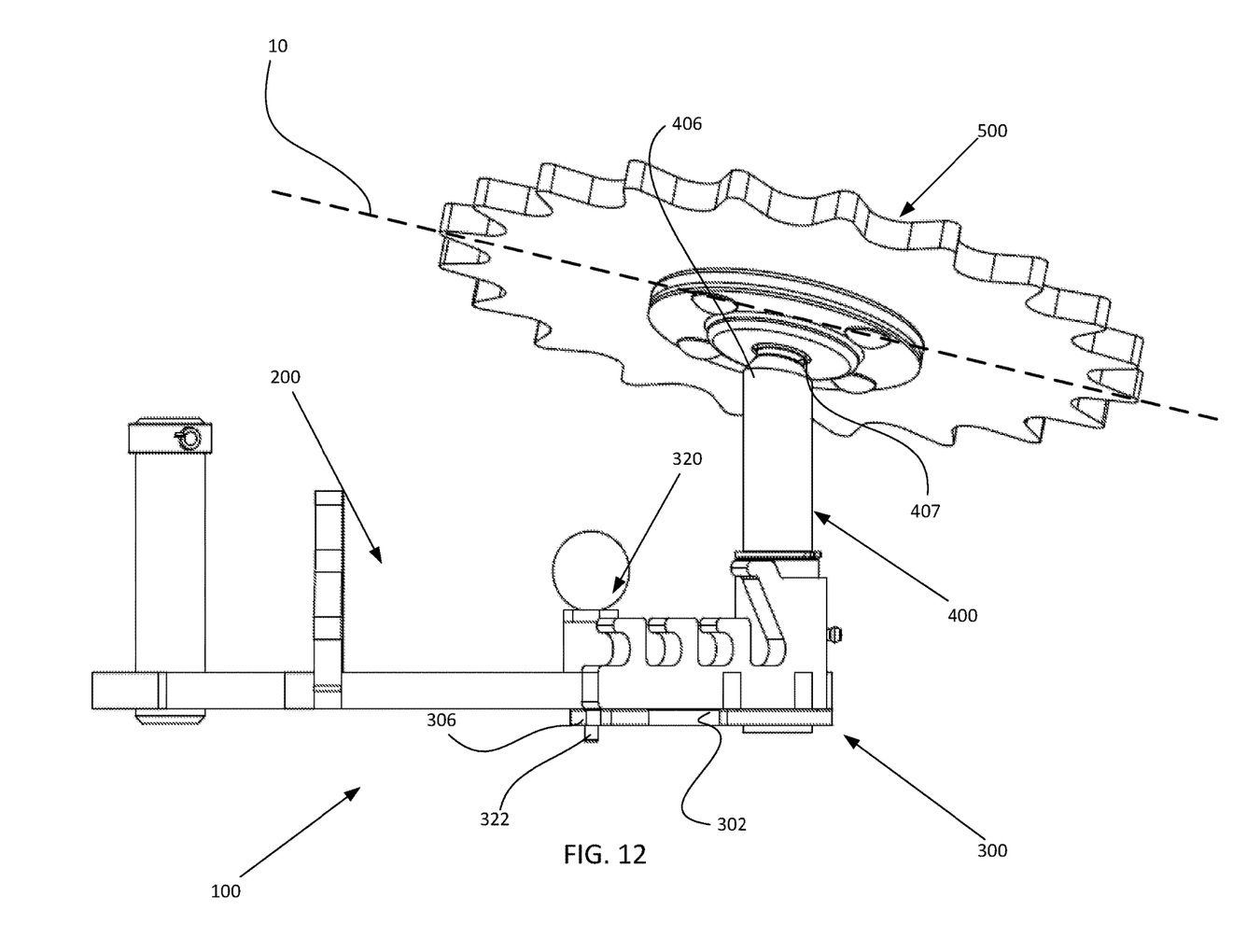
FIG. 12 provides a top view of the closing wheel frame and lever adjustment assembly with a mounted closing wheel and hub in a maximum or aggressive toe-out configuration according to the embodiment of FIG. 10.

FIGS. 10, 11, and 12 provide respective front, perspective, and top views of a closing wheel frame 200 and lever adjustment assembly 300 with a mounted closing wheel assembly 500 in a maximum or aggressive toe-out and positive camber configuration. In the "maximum" or "aggressive" toe-out configuration or orientation the toe-out angle or orientation of the closing wheel assembly is between 5 and 15 degrees relative to a parallel orientation with the frame 200 as shown by line 10 in FIG. 12. In this orientation, the lever arm 302 would be secured in, for example, a highest or top opening in the set of openings 304 by the retaining pin 322.

For purposes of explaining exemplary use of the invention, a range of toe-out settings is described, e.g., a minimum toe-out (e.g., 0-5 degrees), a moderate toe-out (e.g., 3-7 degrees), and an aggressive toe-out (e.g., 5-15 degrees) is based on the type of row closing operation performed by the closing wheel assembly 500 and the overlapping ranges are representative of toe-out angles or orientations that may be used in different soil and planting conditions. For some applications and soil conditions, the minimum toe-out range may start at a negative angle (actually "toe-out"), such as between −3 and 5 degrees relative to the frame 200 or seed trough or furrow or trench.

The angle of the closing wheel assembly 500 may be adjusted by the adjustment assembly 300 to change the angle of engagement of the closing wheel assembly 500 with the soil or ground as desired. Altering or increasing the angle, toe, or camber of the wheels relative to their engagement with the ground may be said to provide a more "aggressive" engagement with the soil which is desirable in moist or wet soil conditions which provides for improved row closing action for a seed trough or furrow or trench in certain soil conditions, such as with wet, moist, or clumping soils. Having a less "aggressive" engagement with the soil may be desirable in drier soil conditions which provides for improved row closing action for a seed trough or furrow or trench in certain soil conditions, such as with dry or hard soils.

Changing the angle of the lever 302 changes the angle of engagement of the closing wheel assembly 500 with the ground and may be set by placing the pin 322 in one of the set of opening 304 which may be a plurality of locating holes, and securing or engaging the pin 322 by releasing the handle 326. The angle the lever adjustment assembly 300 may be adjusted to provide for optimal soil engagement and closing action for varying soil conditions.

Moving the arm of the lever arm 302 increases or decreases the amount of "toe-out" or toe-out angle orientation of the closing wheel while also changing the degree of camber. As the arm of the lever arm 302 is raised, the amount of toe-out increases and when it is lowered the amount of toe-out decreases. The lever arm 302 operates on the adjustable axle assembly 400 and similarly on the closing wheel assembly 500 to move or adjust the position of the face 407 such that the angle of the closing wheel 502 changes with the rotation of the adjustable axle assembly 400 and lever arm 302.

Soils that are high in moisture, which are typical in no tilling or no till farming operations, are particularly hard to close. These types of soils become waxy and are hard to crumble, thus standard smooth closing wheels and other wheels that are not adjustable simply poke holes or leave a continues ribbon which seals the seed so tightly emergence is delayed if the seed even comes up or emerges at all. Being able to change the toe in to crumble a particular soil type and or at higher moisture levels is especially helpful in covering the seed. The crumbled soil allows the seedling to easily emerge while being hidden from sunlight. If the seed is exposed to sunlight, as in an unclosed or partially closed seed trench with air pockets, the seedling can "leaf out" underground which causes severe retardation in the growth of the plant. Adjusting the toe and/or camber or angle of the closing wheel 500 may improve furrow or seed trench closure in different soil conditions.

The down pressure may be adjusted as necessary to adapt to changing soil and terrain conditions to provide for optimal row closing action and soil engagement. This may include increasing down pressure in dry conditions and decreasing down pressure in wet conditions to prevent over or under-engagement with the soil and to prevent air pockets from forming about planted seeds in the seed trench or furrow.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

It should be noted that the present systems and/or methods are not limited to the specific embodiments described herein, but is intended to apply to all similar systems and/or methods for removing debris and/or providing a certain amount of tilling. Modifications and alterations from the described embodiments will occur to those skilled in the art without departure from the spirit and scope of the present systems and/or methods. It should be noted that the present invention is not limited to the specific embodiments pictured and described herein but is intended to apply to all similar methods for ground surface penetration during operation of planter, seeder or drill unit. Accordingly, modifications and alterations from the described embodiments will occur to those skilled in the art without departure from the spirit and scope of the present invention, the scope of which is only limited by the appended claims that follow.

What is claimed is:

1. A closing wheel frame assembly for providing adjustable camber and/or toe orientation of a closing wheel relative to ground, the closing wheel frame assembly comprising:
a closing wheel frame having a first end and a second end, the first end adapted to be rotatably secured to a row planter unit;
a closing wheel assembly having a closing wheel and a hub; and
an adjustable wheel linkage comprising:
a retention mechanism affixed to and supported by the closing wheel frame;
a lever having a set of securing points adapted to engage with the retention mechanism to adjustably hold the lever in one of series of positions, wherein each of the series of positions corresponds to one of the set of securing points;
a closing wheel support member having a first portion fixedly secured to the lever, and a second portion having an angled face adapted for mounting and supporting the closing wheel assembly and further adapted to permit rotational movement of the closing wheel;
wherein the lever is adapted to move relative to the closing wheel frame between securing points in the set of securing points to be secured by the retention mechanism in a desired position; and
wherein adjustment of the lever between the set of securing points sets at least one angle or orientation of the closing wheel assembly relative to the closing wheel frame by repositioning the closing wheel support member.

2. The closing wheel frame assembly of claim 1, wherein repositioning of the closing wheel support member by adjustment of the lever redefines one or both of a toe angle and a camber angle of the closing wheel assembly.

3. The closing wheel frame assembly of claim 1, wherein positioning of the lever along the set of positions sets a toe orientation of the closing wheel assembly between a minimum toe-out orientation of 0 degrees and a maximum toe-out orientation of 15 degrees.

4. The closing wheel frame assembly of claim 1, wherein the closing wheel frame assembly further comprises a closing wheel frame mounting arm secured to the row planter unit and secured to the closing wheel frame at the first end to allow the closing wheel frame assembly to pivot about an axis defined by the closing wheel frame mounting arm, the axis being generally orthogonal to the closing wheel frame and distal to the closing wheel support member.

5. The closing wheel frame assembly of claim 1, wherein the angled face of the closing wheel support member is configured to provide the closing wheel assembly with an angle between 5 and 30 degrees from vertical providing a positive camber.

6. The closing wheel frame assembly of claim 1, wherein adjustment of the lever sets a vertical angle orientation of the closing wheel assembly to provide an adjustable camber orientation.

7. The closing wheel frame assembly of claim 1, wherein the closing wheel support member comprises an adjustable axle having a shaft fixedly secured to the lever, and at least one end of the shaft having an angled face for receiving at least one closing wheel assembly.

8. The closing wheel frame assembly of claim 7, wherein the shaft has, at opposite ends of the shaft, first and second angled faces, each respectively receiving and rotatably supporting a closing wheel assembly and providing a positive camber orientation for the closing wheel assembly pair, and wherein adjusting the lever causes a change in a toe angle of the closing wheel assembly pair.

9. The closing wheel frame assembly of claim 1 further comprising a tension/down pressure adjustment mechanism adapted to provide adjustable down pressure on the closing wheel frame assembly.

10. The closing wheel frame assembly of claim 1, wherein the closing wheel support member comprises a rotatable axle connected to the lever, whereby repositioning the lever from one securing point to an other securing point causes the axle to rotate and change the angular orientation of the closing wheel assembly relative to ground.

11. The closing wheel frame assembly of claim 10, wherein repositioning the lever causes a change in one or both of toe and camber of the closing wheel assembly relative to ground.

12. The closing wheel frame assembly of claim 1, wherein the retention mechanism includes a spring-biased knob connected to a retention pin adapted to engage, disengage, and reengage with the set of securing points to secure the lever in a desired position.

13. The closing wheel frame assembly of claim 1 further comprising a second stage closing section adapted to further tamp down the area immediately about the furrow closed by the closing wheel frame assembly.

14. The closing wheel frame assembly of claim 1, wherein positioning of the lever along the set of positions sets a toe orientation of the closing wheel assembly between a minimum toe-in orientation of 5 degrees and a maximum toe-out orientation of 15 degrees.

15. The closing wheel frame assembly of claim 1, wherein the retention mechanism includes a bolt and nut combination adapted to engage, disengage, and reengage with the set of securing points to secure the lever in a desired position.

16. A row planter unit
a row cleaner assembly adapted to remove debris in advance of for seed and fertilizer placement;
a coulter adapted to open a furrow for seed and fertilizer placement;
a row closing assembly for effectively closing the furrow after the seed is placed, the row closing assembly comprising:
a closing wheel frame having a first end and a second end, the first end adapted to be rotatably secured to a row planter unit;
a closing wheel assembly having a closing wheel and a hub; and
an adjustable wheel linkage comprising:
a retention mechanism affixed to and supported by the closing wheel frame;
a lever having a set of securing points adapted to engage with the retention mechanism to adjustably hold the lever in one of series of positions, wherein each of the series of positions corresponds to one of the set of securing points;
a closing wheel support member having a first portion fixedly secured to the lever, and a second portion having an angled face adapted for mounting and supporting the closing wheel assembly and further adapted to permit rotational movement of the closing wheel;

wherein the lever is adapted to move relative to the closing wheel frame between securing points in the set of securing points to be secured by the retention mechanism in a desired position; and wherein adjustment of the lever between the set of securing points sets at least one angle or orientation of the closing wheel assembly relative to the closing wheel frame by repositioning the closing wheel support member.

* * * * *